Figure 1:
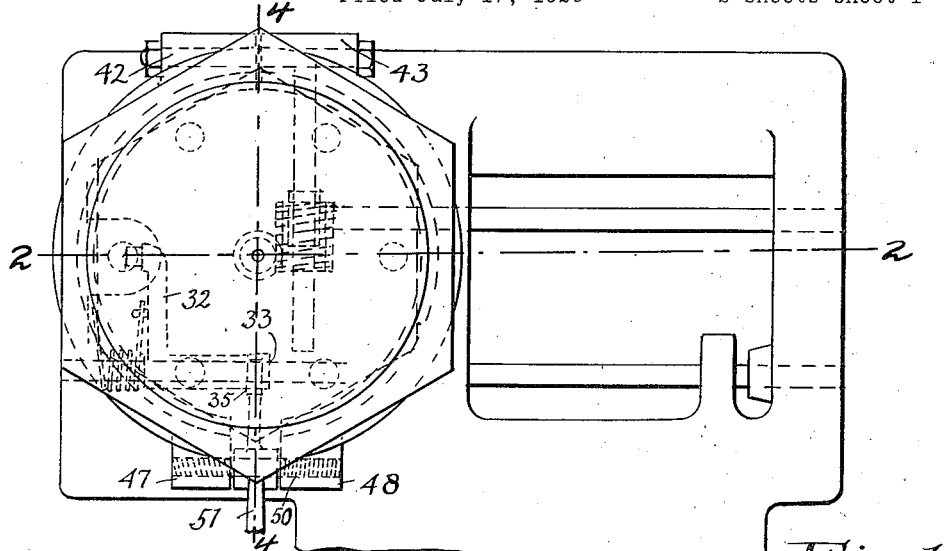

Feb. 27, 1923.

E. P. BURRELL ET AL 1,446,829

TURRET CLAMPING MECHANISM FOR TURRET LATHES

Filed July 17, 1920   2 sheets-sheet 1

Inventors.
Edward P. Burrell
George W. Drake
by Thurston Kwis & Hudson
Attorneys

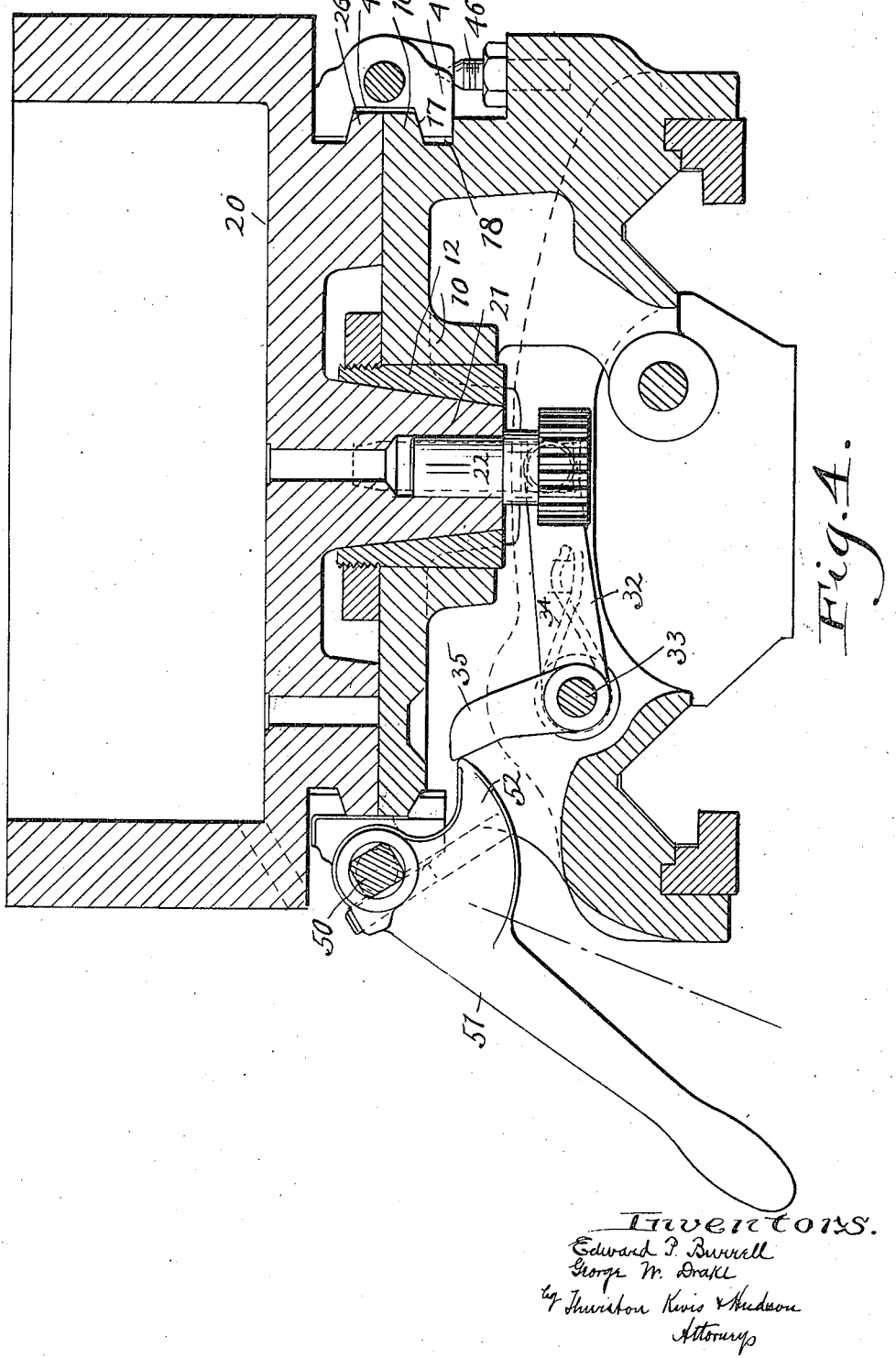

Patented Feb. 27, 1923.

1,446,829

UNITED STATES PATENT OFFICE.

EDWARD P. BURRELL, OF CLEVELAND, AND GEORGE W. DRAKE, OF CLEVELAND HEIGHTS, OHIO, ASSIGNORS TO THE WARNER AND SWASEY COMPANY, OF CLEVELAND, OHIO, A CORPORATION OF OHIO.

TURRET-CLAMPING MECHANISM FOR TURRET LATHES.

Application filed July 17, 1920. Serial No. 396,945.

*To all whom it may concern:*

Be it known that we, EDWARD P. BURRELL and GEORGE W. DRAKE, citizens of the United States, and residents, respectively, of Cleveland, in the county of Cuyahoga and State of Ohio, and Cleveland Heights, in the county of Cuyahoga and State of Ohio, have invented a certain new and useful Improvement in Turret-Clamping Mechanism for Turret Lathes, of which the following is a full, clear, and exact description.

This invention relates to novel means for immovably fixing the turret to the turret slide of a turret lathe in order that there shall be no possibility of a movement of the turret relative to the slide while the tools are making their cuts, and whereby the turret may be easily released in order that it may make its indexing movements.

The invention consists in the construction and combination of parts shown in the drawings and hereinafter described and pointed out definitely in the appended claims.

Figure 2:
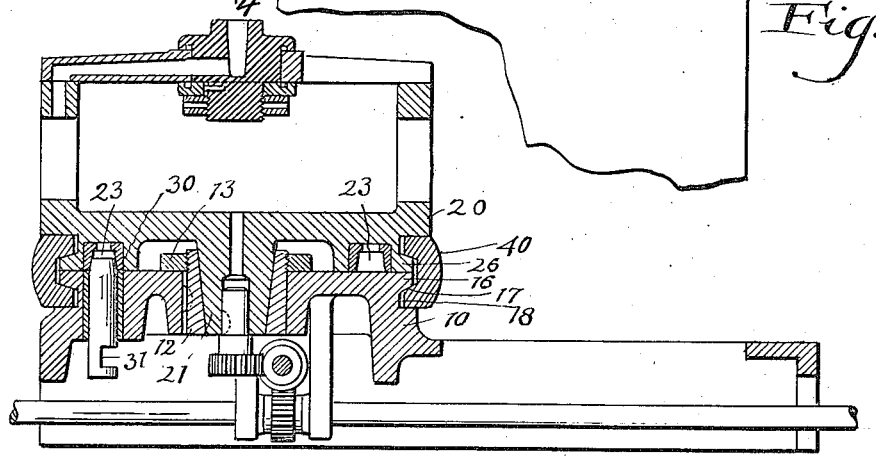
Figure 3:
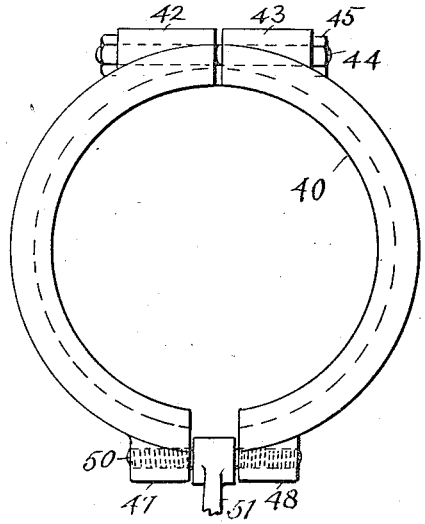

In the drawings, Fig. 1 is a plan view of the turret slide and turret of a turret lathe; Fig. 2 is a central, vertical section in the plane of line 2—2 of Fig. 1; Fig. 3 is a plan view of the clamping ring detached, and Fig. 4 is an enlarged vertical, sectional view on the plane of line 4—4 of Fig. 1.

Referring to the parts by reference characters, 10 represents the turret slide of a turret lathe, and 20 represents the turret which is supported on said slide and has a pivotal connection therewith on a vertical axis. The means shown for effecting this pivotal connection includes a downwardly extended conical stud 21 on the turret, and a conical bushing 12 which fits the stud and is itself adjustable in a hole through the top wall of the turret slide by means of a nut 13 which screws on the projecting threaded upper end of said bushing. The turret will be locked in the various working positions by means of a locking pin 30 which is movable vertically in a hole through the top wall of the turret slide, and may enter any one of the several recesses 23 in the lower face of the turret. This locking pin has a notch 31 in its side and near its lower end. An arm 32 which is fixed to a rock shaft 33 projects into this notch 31. The rock shaft 33 is supported in bearings on the turret slide, and it is under the influence of a spring 34 tending to so rock it as to move the locking pin in the locking direction.

At its lower edge the turret is provided with an annular outwardly extended flange 26 which is coaxial with the turret; and the upper face of this flange is slightly beveled. A co-operating outwardly extending annular flange 16, which is likewise coaxial with the turret, is formed on the turret slide at its upper edge. The lower wall 17 of this annular flange is slightly beveled, and forms the top wall of an annular groove 18 into which the lower edge of the clamping ring 40 projects, whereby said clamping ring is supported in operative position.

This clamping ring 40 is made in two halves. In the inner concave face of the two part clamping ring is an annular conical groove 41 into which the flanges 16 and 26 project when the clamping ring is in working position. Two adjacent ends of the two parts of the clamping ring are formed respectively with sleeves 42 and 43, and a bolt 44 passes through these sleeves; and this bolt and its nut 45 determines how far apart these ends of the clamping ring sections may be spread apart. A tapered pin 46 fixed to the turret slide goes into the space between these ring sections and supports the ends of the ring sections so as to prevent dragging on the beveled surface of the flange 26 projecting from the turret, thus allowing the turret to rotate freely. At the front end of the machine these clamping ring sections are provided with oppositely threaded sleeves 47 and 48. A clamping screw 50, having its opposite ends oppositely threaded, screws into these sleeves 47 and 48. An operating hand lever 51 is fixed to this double screw between the adjacent ends of the clamping ring. By manipulating this hand lever the screw is turned, and thereby the ends of the clamping ring are drawn together (with the result of firmly clamping the turret down upon the turret slide) or moved apart so as to release the turret and permit it to be turned.

When the turret has been released from the clamping action of clamping ring (but at no other time) the turret locking pin 31 should be withdrawn. To insure this action, the hub of the operating hand lever 51 is formed with a cam arm 52, the function of which is to rock the rock shaft 33 so as to withdraw the lock pin. This function may be performed by allowing the cam arm to extend through the adjacent wall of the slide and act directly on an arm 35 fixed to the rock shaft 33, as shown in Fig. 4.

The drawing (Fig. 1) shows the operating hand lever 51 in a midway position, such as it occupies when the clamping device is released. By moving the lever down from this position the lock pin will be withdrawn. By moving it up from this position the turret will be clamped.

Having described our invention, we claim:—

1. In a turret lathe, the combination of a turret slide, a turret rotatably mounted thereon, a split clamping ring for clamping the turret to the slide, a right and left hand screw whose ends respectively engage the two separable ends of said clamping ring and which is provided with an operating handle and with a cam arm, a turret lock pin, a rock shaft engaging said lock pin and provided with an operating arm which is extended into the path of said cam arm.

2. In a turret lathe, the combination of the turret slide, and the turret which is rotatably mounted thereon,—the turret being provided on its lower edge with an outwardly extended annular flange which is coaxial with the turret and has a beveled upper face, and the turret slide being provided with a similar flange having a beveled lower face, with a clamping ring composed of two sections in the concave surface of which is a conical groove into which the two flanges project, two adjacent ends of said ring sections being adjustably connected, a stud adjustably secured to the turret slide and engaging the ring sections so as to support the same, and means engaging the other two ends of the ring sections to draw them together.

3. In a turret lathe, the combination of the turret slide, and the turret which is rotatably mounted thereon,—the turret being provided on its lower edge with an outwardly extended annular flange which is coaxial with the turret and has a beveled upper face, and the turret slide being provided with a similar outwardly projecting flange having a beveled lower face, and the turret slide having below said flange an outwardly facing annular groove, a clamping ring supported by the slide at the base of said groove and having a conical annular groove in its concave surface into which the two flanges project, means for contracting said ring to clamp the turret to the turret slide, a locking bolt, and means actuated by the ring-clamping means to withdraw said locking bolt.

In testimony whereof, we hereunto affix our signatures.

EDWARD P. BURRELL.
GEORGE W. DRAKE.